United States Patent
Kang

(10) Patent No.: US 7,362,340 B2
(45) Date of Patent: Apr. 22, 2008

(54) METHOD FOR CONTROLLING RESOLUTION OF GRAPHIC IMAGE

(75) Inventor: Jung Yong Kang, Kyunggi-Do (KR)

(73) Assignee: Humax Co., Ltd., Yougin (KR)

( * ) Notice: Subject to any disclaimer, the term of this patent is extended or adjusted under 35 U.S.C. 154(b) by 0 days.

(21) Appl. No.: 10/782,879

(22) Filed: Feb. 23, 2004

(65) Prior Publication Data

US 2004/0207655 A1    Oct. 21, 2004

(30) Foreign Application Priority Data

Feb. 21, 2003    (KR) ............... 10-2003-0010909

(51) Int. Cl.
*G09G 5/00*    (2006.01)
*G09G 5/02*    (2006.01)

(52) U.S. Cl. .............. 345/660; 345/661; 345/581; 345/694; 345/695; 345/698; 345/634

(58) Field of Classification Search ......... 345/660, 345/1.1, 634, 581, 694–698
See application file for complete search history.

(56) References Cited

U.S. PATENT DOCUMENTS 5,844,539 A * 12/1998 Kitagawa .................. 345/100
5,903,253 A * 5/1999 Mizutome et al. .......... 345/694
6,028,585 A * 2/2000 Ishii et al. .................. 345/581
6,236,388 B1 * 5/2001 Iida et al. ................... 345/698
6,493,008 B1 * 12/2002 Yui ............................ 715/840
6,618,026 B1 * 9/2003 Grigor et al. ............... 345/1.1
6,771,278 B2 * 8/2004 Shigeta ....................... 345/634
2002/0089523 A1 * 7/2002 Hodgkinson

* cited by examiner

*Primary Examiner*—Jin-Cheng Wang
(74) *Attorney, Agent, or Firm*—Birch, Stewart, Kolasch & Birch, LLP

(57) ABSTRACT

The present invention relates to a method for controlling a resolution of a graphic image. When various electronic devices such as a personal computer (PC), a set-top box (STB) equipped with an Internet function, etc. enable an external display unit such as a television (TV) or etc. to display the graphic image, a resolution of the graphic image is controlled such that the graphic image can be fully displayed on a valid screen of the external display unit. Therefore, a user selection menu bar located at an outer portion of the graphic image can be appropriately displayed and a user can easily select a desired menu item.

10 Claims, 6 Drawing Sheets

200 (Monitor)

METHOD FOR CONTROLLING RESOLUTION OF GRAPHIC IMAGE

This Non-provisional application claims priority under 35 U.S.C. § 119(a) on patent application Ser. No(s). 10-2003-0010909 filed in Korea on Feb. 21, 2003, the entire contents of which are hereby incorporated by reference.

BACKGROUND OF THE INVENTION

1. Field of the Invention

The present invention relates to a method for controlling a resolution of a graphic image and more particularly to a method for controlling a resolution of a graphic image when various electronic devices such as a personal computer (PC), a set-top box (STB) equipped with an Internet function, etc. enable an external display unit such as a television (TV) or etc. to display the graphic image.

2. Description of the Related Art

Recently, there is increasing the case where an external display unit such as a television (TV) is used while being coupled to a personal computer (PC) or a set-top box (STB) equipped with an Internet function. As shown in FIG. 1, a personal computer (PC) 100 includes a central processing unit (CPU) 10, a graphic card 11, a keyboard controller 12, a disc drive 13 and an Internet module 14. Here, the PC 100 can be used while being coupled to a monitor 200 or television (TV) 300. Where a user makes a request to change the resolution of a graphic image displayed on the monitor 200 using a keyboard or mouse, the CPU 10 sets a "display control mode" through an interface with the keyboard controller 12 coupled to a bus line. The CPU 10 confirms the graphic image's resolution value selected by a user from among the conventional monitor's resolution values, e.g., "640×480" pixels, "800×600" pixels, "1024×768" pixels, "1152×864" pixels, "1280×1024" pixels, "1600×1200" pixels, etc. Furthermore, the CPU 10 controls the graphic card 11 so that the graphic image's resolution value selected by the user is set and stored. The graphic card 11 refers to the set resolution value of the graphic image and controls the number of horizontal and vertical pixels of the graphic image to be displayed on the monitor 200. Thus, the monitor 200 displays a graphic image of the number of pixels corresponding to the set resolution value. As shown in FIG. 2, a top portion of the monitor screen fully displays a menu bar. On the other hand, where the PC 100 is used while being coupled to the TV 300, the CPU 10 sets a "display control mode" in response to a user request. The CPU 10 confirms the graphic image's resolution value selected by the user from among the resolution values capable of being accommodated in the conventional TV, e.g., "720×480" pixels, "1920×1080" pixels, "1280×720" pixels, etc.

Furthermore, the CPU 10 controls the graphic card 11 so that the graphic image's resolution value selected by the user is set and stored. The graphic card 11 refers to the set resolution value of the graphic image and controls the number of horizontal and vertical pixels of the graphic image to be displayed on the TV 300. Thus, the TV 300 displays a graphic image of the number of pixels corresponding to the set resolution value as shown in FIG. 3.

However, where the PC is used while being coupled to the conventional TV in which a size of a valid screen displaying the conventional video image is smaller than that of an actual physical screen, part of an outer portion of the graphic image is not appropriately displayed as shown in FIG. 3. In particular, where the menu bar to be selected by the user is located at the top portion of the graphic image, there is a problem in that a menu item desired by the user cannot be selected because the menu bar cannot be displayed on the valid screen.

Furthermore, where the graphic image is displayed after the resolution of an externally received graphic image is controlled using a scaling technique in the conventional TV, there is another problem in that characters contained in the graphic image are distorted and the distorted characters are displayed.

SUMMARY OF THE INVENTION

Therefore, the present invention has been made in view of the above problems, and it is one object of the present invention to provide a method that can fully display a graphic image on a valid screen of an external display unit when various electronic devices such as a personal computer (PC), a set-top box (STB) equipped with an Internet function, etc. enable an external display unit such as a television (TV) or etc. to display the graphic image.

It is another object of the present invention to provide a method that can fully display important content located at an outer portion of a graphic image within a valid screen when the graphic image is displayed on a television (TV).

It is yet another object of the present invention to provide a method that can prevent an image created on the basis of a television (TV) from being biased to one side when various electronic devices such as a personal computer (PC), a set-top box (STB) equipped with an Internet function, etc. enables the TV to display the image received through a digital broadcast.

In accordance with an aspect of the present invention, the above and other objects can be accomplished by the provision of a method for controlling a resolution of a graphic image, comprising the steps of: (a) selecting a resolution value of the graphic image to be displayed on an external display unit; (b) additionally selecting another resolution value corresponding to a valid screen of the external display unit; (c) confirming a source type of the graphic image to be displayed on the external display unit and a screen mode; and (d) referring to the selected resolution values and reconfiguring the graphic image, according to a result of the confirmation.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFFERRED EMBODIMENTS

Hereinafter, preferred embodiments of a method for controlling a resolution of a graphic image in accordance with the present invention will be described in detail with reference to the annexed drawings.

Figure 1:
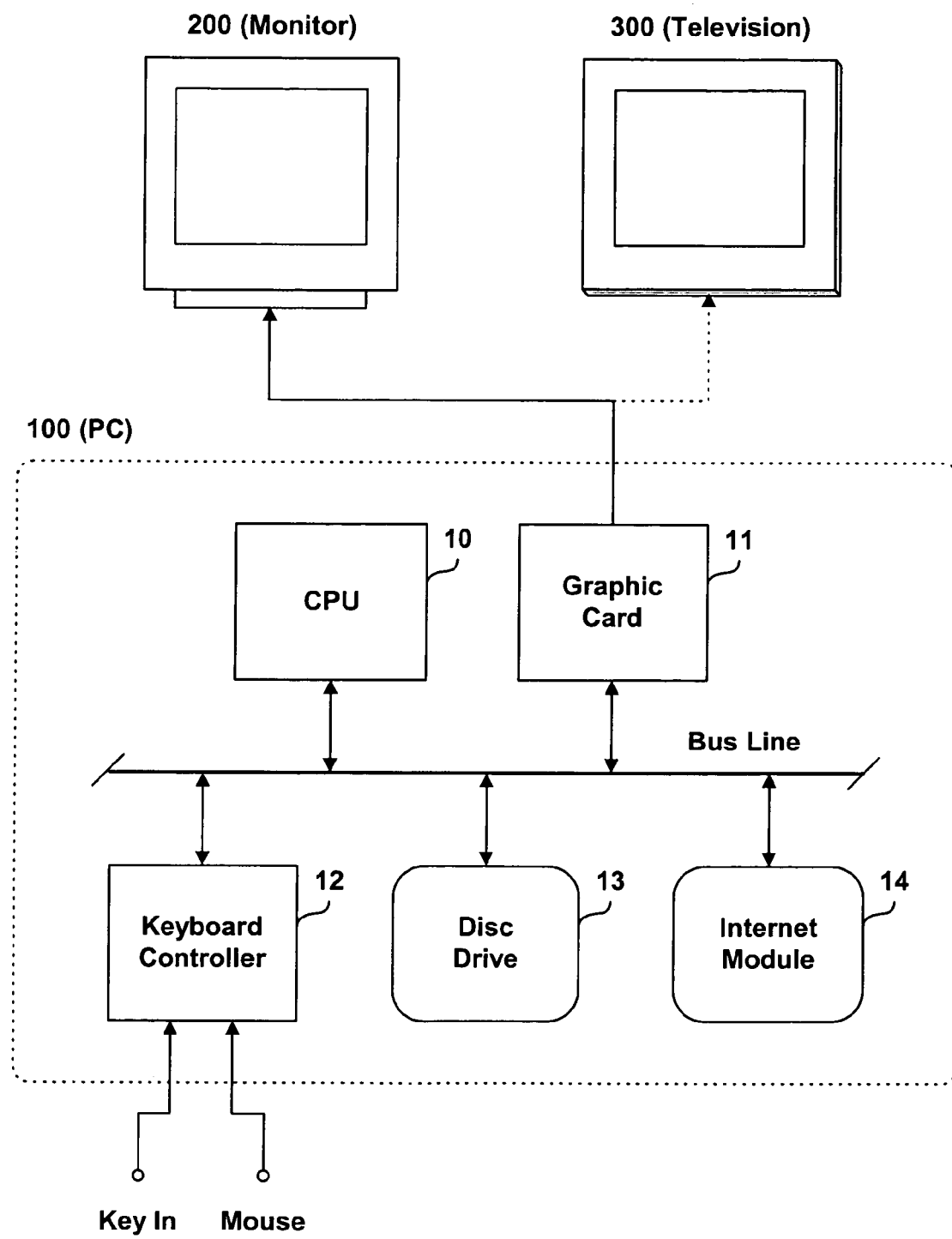
FIG. 1 is a schematic block diagram illustrating the case where a conventional monitor or television is used while being coupled to a personal computer (PC)
Figure 2:
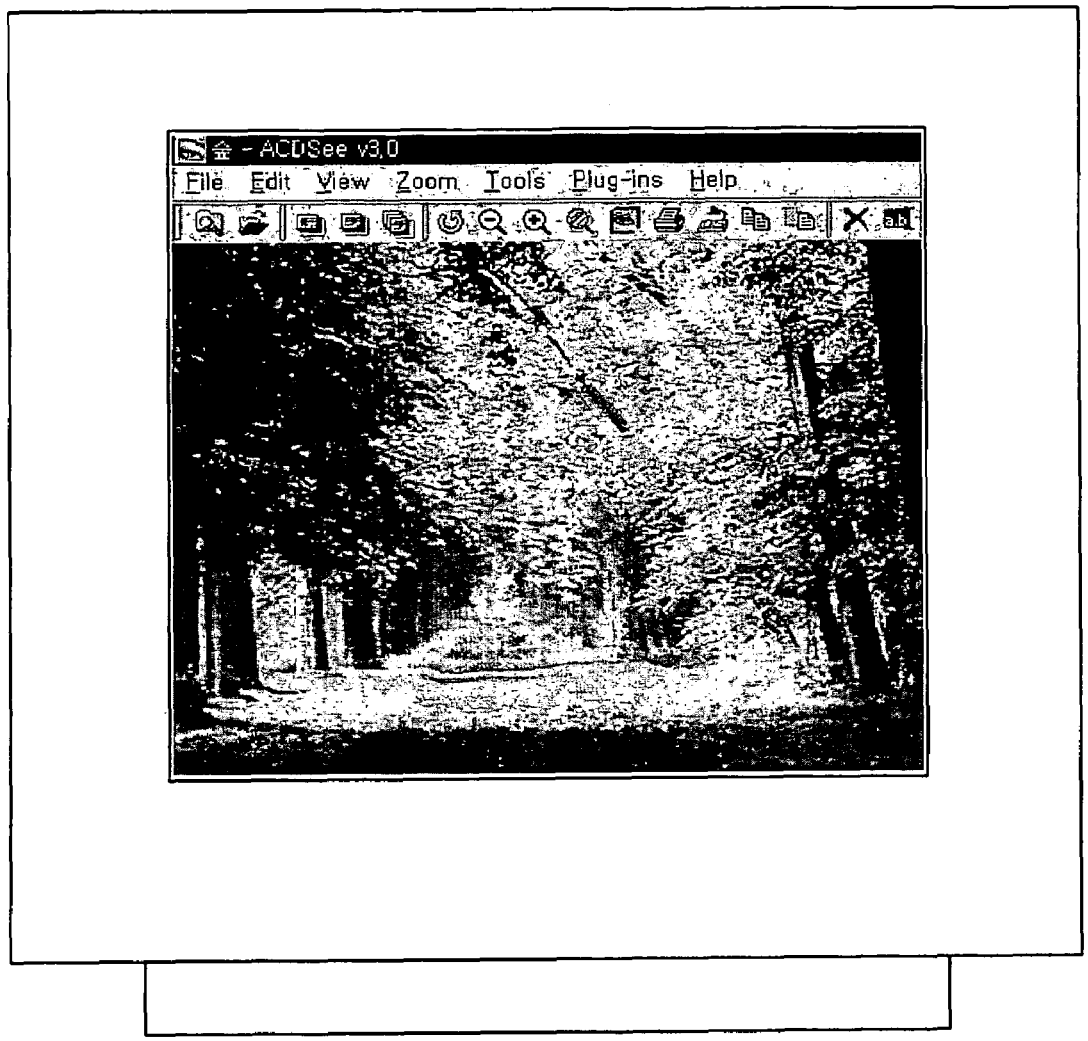
FIG. 2 is an exemplary view illustrating the case where the conventional PC enables a monitor screen to display a graphic image.
Figure 3:
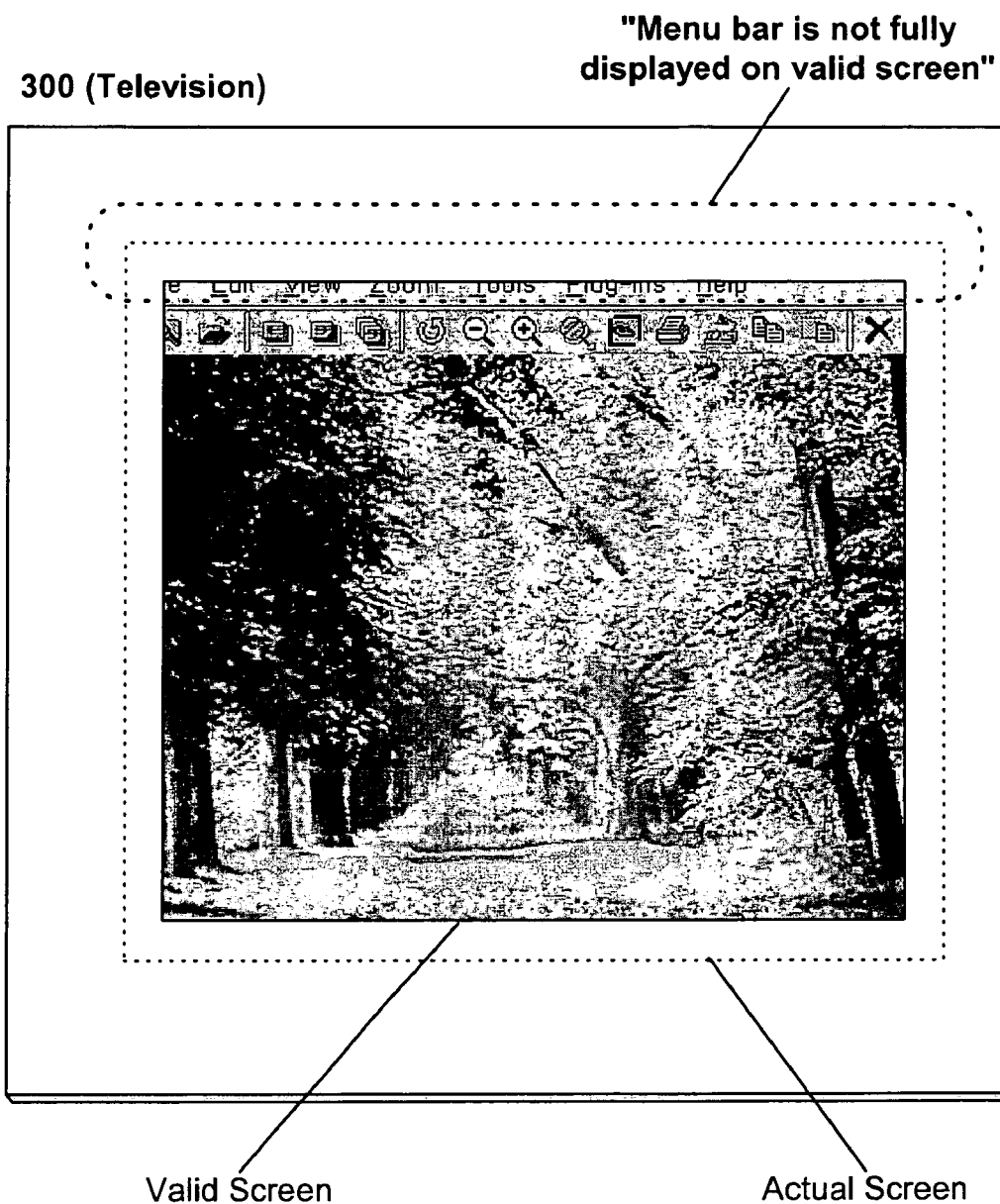
FIG. 3 is an exemplary view illustrating the case where the conventional PC enables a television (TV) screen to display a graphic image.

The method for controlling a resolution of a graphic image in accordance with the present invention can be applied to various electronic devices such as a personal computer (PC), a set-top box (STB) equipped with an Internet function, etc. Where the CPU 10 of the PC 100 constituted as described with reference to FIG. 1 sets a "display control mode" in response to a user request in a state in which the PC 100 is coupled to the conventional television (TV) 300, a resolution setting and controlling operation is performed so that a graphic image can be fully displayed on a valid screen of the TV 300. This will now be described in detail.

Figure 4:
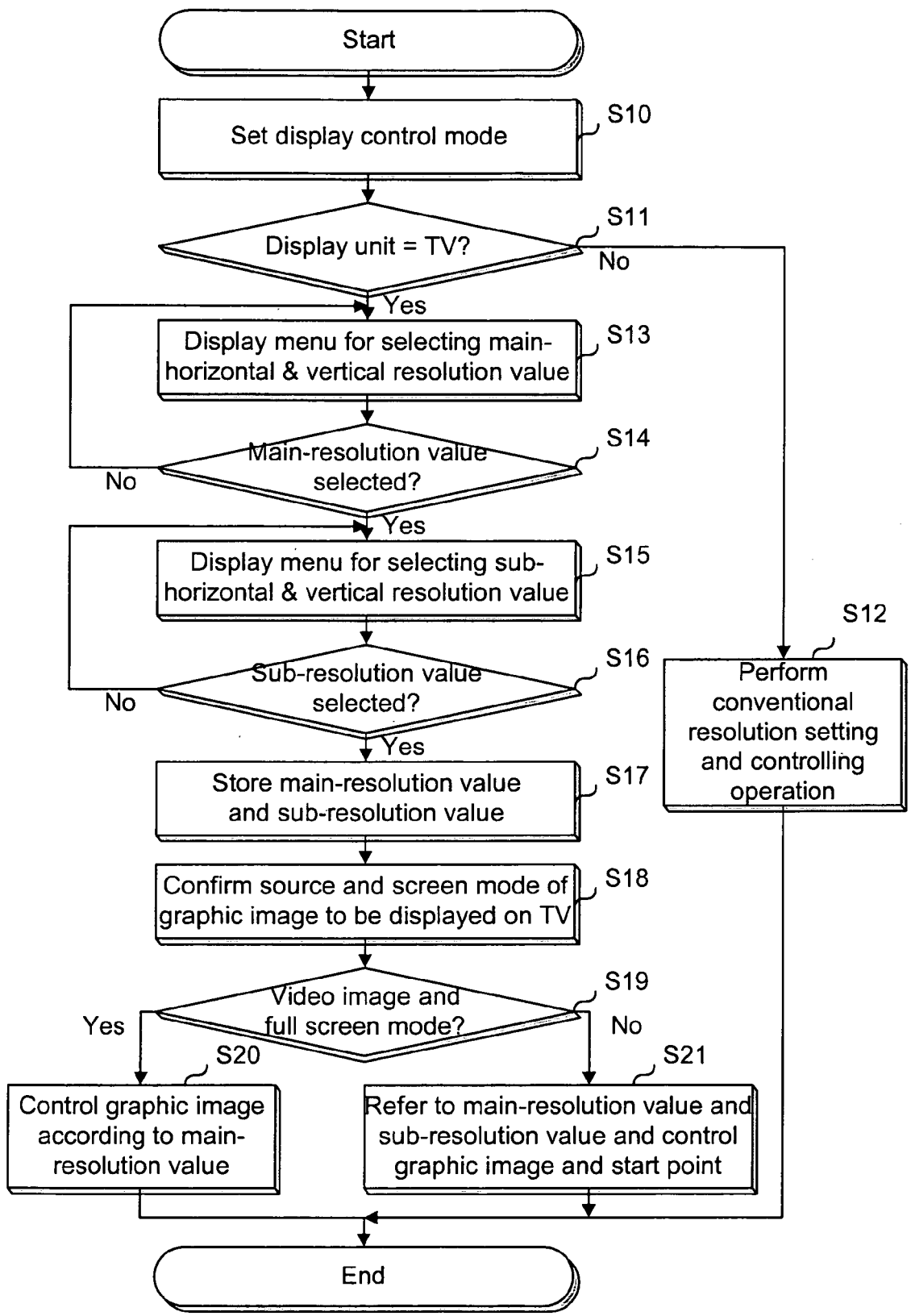
FIG. 4 is a flowchart illustrating a method for controlling a resolution of a graphic image in accordance with a preferred embodiment of the present invention.

FIG. 4 is a flowchart illustrating a method for controlling a resolution of a graphic image in accordance with a preferred embodiment of the present invention.

The CPU 10 sets a "display control model" in response to a user request (S10).

A user can select a display unit to be coupled to the PC 100 in the "display control mode". For example, where the user selects a television (TV) as the display unit in a state in which the PC 100 is coupled to the conventional TV 300 (S11), the CPU 10 displays a user menu so that any one of a plurality of main-horizontal and vertical resolution values corresponding to horizontal and vertical frequencies capable of being accommodated in the conventional TV 300 can be selected (S13). That is, the user menu displays the resolution values such as "720×480" pixels, "1920×1080" pixels, "1280×720" pixels, etc. Furthermore, the CPU 10 determines whether one of the main-resolution values has been selected (S14).

Then, the CPU 10 enables a selection menu necessary for controlling a sub-horizontal and vertical resolution value to be displayed so that a graphic image based on the selected main-horizontal and vertical resolution value can be appropriately displayed within a valid screen (S15). If the user has selected the "1280×720" pixels as the main-horizontal and vertical resolution value, for example, "1200×700" pixels can be selected as the sub-horizontal and vertical resolution value. Furthermore, the CPU 10 determines whether the sub-horizontal and vertical resolution value has been additionally selected (S16). Then, the CPU 10 controls the graphic card 11 and stores the main-resolution value and the sub-resolution value (S17).

On the other hand, the CPU 10 determines whether a source of the graphic image to be displayed on the TV is a video image and determines whether a screen mode is a full screen mode if the source of the graphic image is a video image or broadcast image (S18).

For example, where a playback video image of a digital versatile disc (DVD) inserted into the disc drive 13 is outputted in the full screen mode (S19), the CPU 10 controls the graphic card 11 and enables the TV 300 to display an image in which the number of horizontal and vertical pixels is controlled in response to the main-horizontal and vertical resolution value selected by the user (S20).

Figure 5:
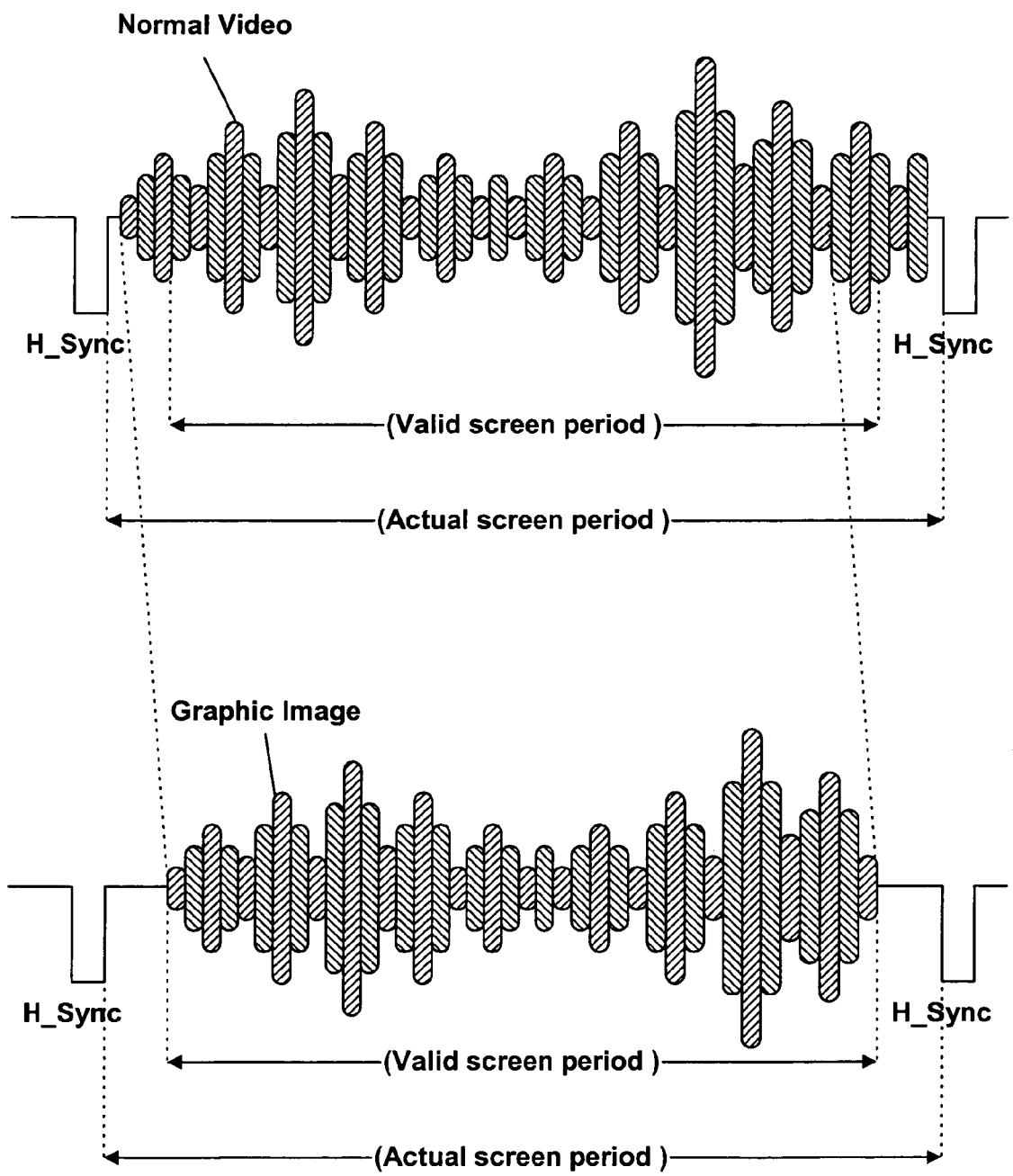
FIG. 5 is an explanatory view illustrating the case where a start point of a graphic image based on the controlled resolution is shifted to within a valid display period in accordance with the present invention.

However, where the TV displays a graphic image rather than a video image, or displays a video image or broadcast image in another screen mode rather than the full screen mode (S19), the graphic card 11 refers to the main-horizontal and vertical resolution value and the sub-horizontal and vertical resolution value selected by the user, and performs a resolution controlling operation for controlling the number of horizontal and vertical pixels of the graphic image to be displayed on the TV and resetting start and end points of the controlled graphic image (S21). As shown in FIG. 5, the start point of the graphic image is shifted to within the valid screen contained between horizontal sync signals H_Sync according to the resolution controlling operation, and part of a rear end of the graphic image is excluded from a valid display period, such that the number of pixels of the graphic image in a horizontal direction is reduced and the number of lines of the graphic image in a vertical direction is reduced.

Figure 6:
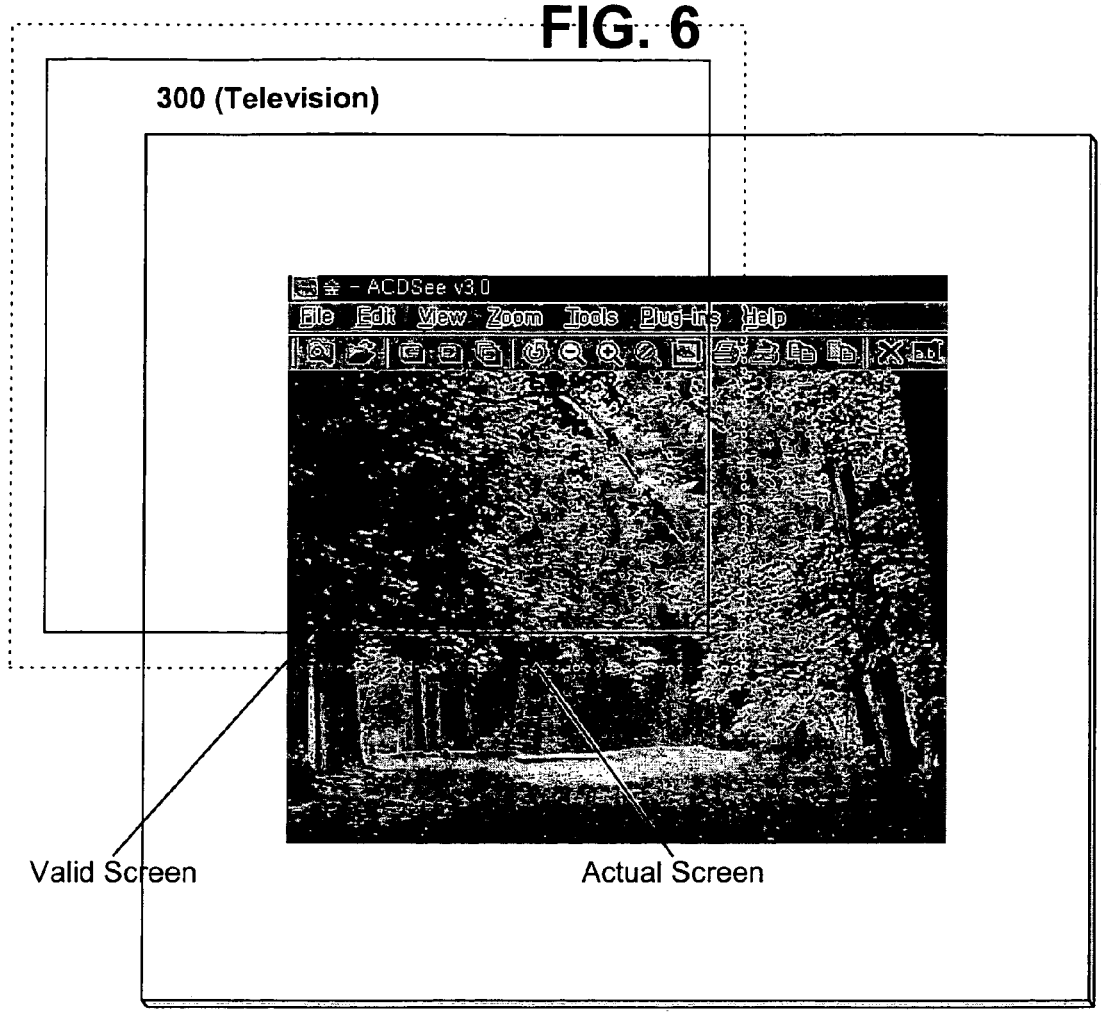
FIG. 6 is an exemplary view illustrating the case where a graphic image based on a controlled resolution is displayed on a valid screen of the TV in accordance with a preferred embodiment of the present invention.

As shown in FIG. 6, a user selection menu bar located at a top portion of the graphic image is appropriately displayed, and the user can select a desired item. Furthermore, where a video image or broadcast image created on the basis of the conventional TV is displayed in the full screen mode, the present invention can prevent the image from being biased to one side, owing to the resolution controlling operation, without being displayed at the center of the television screen.

As described above, the present invention can be applied to a set-top box (STB) equipped with an Internet function. In this case, a user can control resolutions of various graphic images received through the Internet by referring to a main-horizontal and vertical resolution value and a sub-horizontal and vertical resolution value selected by the user, such that the graphic image can be fully displayed within the valid screen of the conventional TV. Furthermore, where a broadcast image received by the STB through a digital broadcast is displayed on the TV in a full screen mode, the broadcast image can be controlled by only the main-horizontal and vertical resolution value instead of the above-described resolution controlling operation, and the broadcast image created on the basis of the TV can be prevented from being biased to one side of the TV screen.

As apparent from the above description, the present invention provides a method for controlling a resolution of a graphic image that can fully display important content located at an outer portion of a graphic image within a valid screen of an external display unit such as a television (TV) or etc., that can appropriately display a user selection menu bar located at an outer portion of the graphic image, and that enables the user to easily select a desired menu item. Furthermore, the method of the present invention can prevent the broadcast image created on the basis of the TV from being biased to one side of the TV screen.

Although the present invention has been described in connection with specific preferred embodiments, those skilled in the art will appreciate that various modifications, additions, and substitutions to the specific elements are possible, without departing from the scope and spirit of the present invention as disclosed in the accompanying claims.

What is claimed is:

1. A method for controlling a resolution of a graphic image comprising:
    (a) selecting a first resolution value of the graphic image to be displayed on an external display unit, said first resolution value corresponding to first horizontal and vertical resolution values;
    (b) additionally selecting a second resolution value corresponding to a valid screen size of the external display unit, said second resolution value being less than the first resolution value, and said second resolution value corresponding to second horizontal and vertical resolution values corresponding to a valid horizontal and vertical frequency so that the graphic image controlled by the first resolution value selected at the step (a) is displayed within the valid screen size;

(c) confirming a source type on the graphic image to be displayed on the external display unit and a screen mode;

(d) referring to at least one from the selected first and second resolution values and reconfiguring the graphic image according to a result of the confirmation; and (e) shifting a start point of the graphic image controlled by the second horizontal and vertical resolution values selected at the step (b) to within a valid display period contained between horizontal sync signals and excluding part of a rear end of the graphic image from a valid display period such that a number of pixels of the graphic image in a horizontal direction is reduced and a number of lines of the graphic image in a vertical direction is reduced, wherein if the source type of the confirmed graphic image is a source type other than a video or broadcast image or is a video or broadcast image based on a screen mode other than a full screen mode, the referring step (d) refers to the first and second resolution values, and if the source type of the confirmed graphic image is a video or broadcast image based on a full screen mode, the referring step (d) refers only to the first resolution value, and wherein the part of the rear end of the graphic image excluded from the valid display period corresponds to an amount the start point of th.e graphic image is shifted to within the valid display period.

2. The method as set forth in claim 1, wherein the external display unit is a television (TV).

3. The method as set forth in claim 2, wherein the step (a) is carried out by selecting any one of a plurality of first horizontal and vertical resolution values corresponding to horizontal and vertical frequencies capable of being accommodated in the TV.

4. The method as set forth in claim 2, wherein the step (d) is carried out by controlling the first resolution of the graphic image on the basis of the resolution value selected at the step (a) when the source type of the confirmed graphic image is a video image and a screen mode is a full screen mode.

5. The method as set forth in claim 4, wherein the video image is a video image read and reproduced from an optical disc or a broadcast image received through a broadcast.

6. A system for controlling a resolution of a graphic image comprising:

an input device configured to allow a user to select a first resolution value of the graphic image to be displayed on an external display unit, and to select a second resolution value corresponding to a valid screen size of the external display unit, the second resolution value being less than the first resolution value, said first resolution value being first horizontal and vertical resolution values, and said second resolution value being second horizontal and vertical resolution values corresponding to a valid horizontal and vertical frequency so that the graphic image controlled by the first resolution value selected using the input device is displayed within the valid screen size; and a processing unit configured to confirm a source type on the graphic image to be displayed on the external display unit and a screen mode, and to refer to at least one from the selected first and second resolution values and to reconfigure the graphic image according to a result of the confirmation, wherein if the source type of the confirmed graphic image is a source type other than a video or broadcast image or is a video or broadcast image based on a screen mode other than a full screen mode, the processing unit refers to the first and second resolution values, and if the source type of the confirmed graphic image is a video or broadcast image based on a full screen mode, the processing unit refers only to the first resolution value, and wherein the processing unit shifts a start point of the graphic image controlled by the second horizontal and vertical resolution values selected using the input unit to within a valid display period contained between horizontal sync signals and excludes part of a rear end of the graphic image from the valid display period such that a number of pixels of the graphic image in a horizontal direction is reduced and a number of lines of the graphic image in a vertical direction is reduced, and wherein the part of the rear end of the graphic image excluded from the valid display period corresponds to an amount the start point of the graphic image is shifted to within the valid display period.

7. The system as set forth in claim 6, wherein the external display unit is a television (TV).

8. The system as set forth in claim 7, wherein the first resolution values include any one of a plurality of horizontal and vertical resolution values corresponding to horizontal and vertical frequencies capable of being accommodated in the TV.

9. The system as set forth in claim 7, wherein the processing unit controls the resolution of the graphic image based on the first resolution value when the source type of the confirmed graphic image is a video image and a screen mode is a full screen mode.

10. The system as set forth in claim 9, wherein the video image is a video image read and reproduced from an optical disc or a broadcast image received through a broadcast.

* * * * *